F. MICHAEL.
Granulating Sugar.

No. 62,146.    Patented Feb. 19, 1867.

United States Patent Office.

F. MICHAEL, OF GRATIS, OHIO.

Letters Patent No. 62,146, dated February 19, 1867.

IMPROVEMENT IN APPARATUS FOR GRANULATING SUGAR.

The Schedule referred to in these Letters Patent and making part of the same.

TO ALL WHOM IT MAY CONCERN:

Be it known that I, F. MICHAEL, of Gratis, Preble county, Ohio, have made certain new and useful Improvements in Houses for Granulating Sugar; and I hereby declare that the following is a true, full, and exact description of the same, reference being had to the accompanying drawings, and to the letters of reference marked thereon. In the annexed drawings which make a part of this specification—

Figure 1:
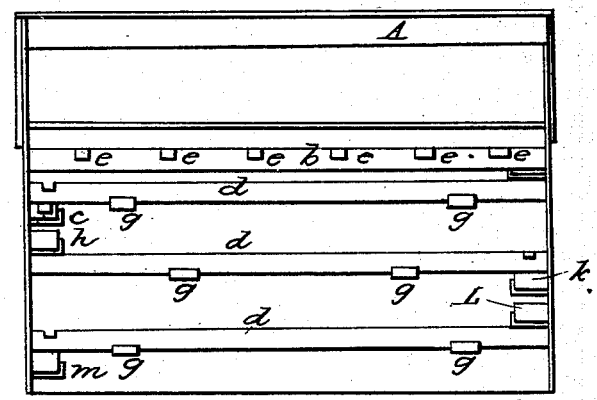
Figure 1 represents a front elevation of my sugar-house.
Figure 3:
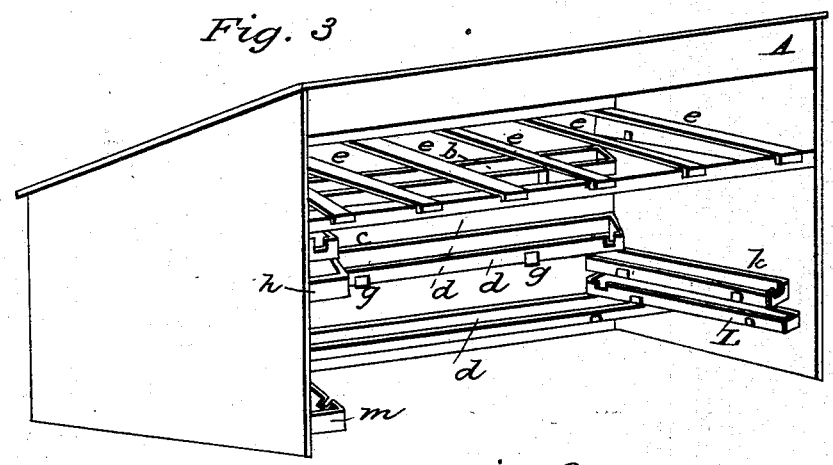
Figure 2:
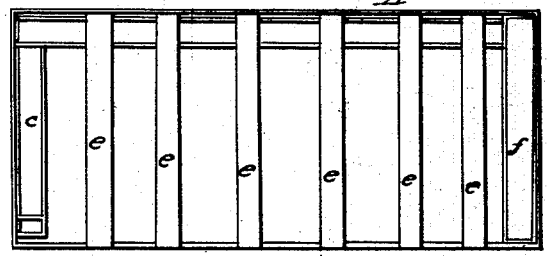
Figure 2 is a plan view of the same with the top removed.

In fig. 1, A represents the sugar-house; $b$ designates a girder, which binds the two sides of the house together in front. The girder $b$ is strengthened by a series of ties or joists, $c$, which are fastened at one end to girder $b$, and at the other end firmly secured to the back of A. Under the ties $e$, and fastened to the back of A, are the three conduits, $d$, which are held in a horizontal position by the brackets $g$, immediately above the top conduit $d$, and at right angles with $d$ is placed the conduit $f$, which is supported by brackets to the end of A. The conduit $f$ has an opening at its upper edge, and directly over conduit $d$, for the discharge of the ungranulated sirup into $d$. From $d$, the same sirup will flow through an opening near the top of $d$, into the conduit $e$, which is directly under $d$; and placed at the opposite end of $f$, at the outer end of conduit $e$, an opening is left near its top for the flow of the sirup into conduit $h$, which projects a little further outward than $e$. From $e$, the sirup flows into the second conduit $d$ through an opening near the top of $h$, and near its inner end. The sirup now flows to the opposite end of said conduit $d$, and is discharged through an opening near its top into the conduit K. From K the sirup flows into L, immediately under K, both K and L having openings at their inner ends similar to those already described. From L the sirup flows into the lowest conduit $d$, and from thence into trough $m$, where the granulating process, if unfinished before, can be completed. Before the sirup is introduced into my sugar-house the following rules must be observed. The juice of the sugar after being properly filtered will be boiled to the consistency of forty degrees by the saccharometer, and after it is thoroughly cooled must be put into barrels. After remaining in barrels say ten days, it is prepared to go to the sugar-house, when the barrels are placed on the ties $e$, so as to be convenient for discharging their contents into conduits $f$, and from $f$ flowing into the remaining conduits and into trough $m$, as already described. The discharge of the sirup or molasses from the barrel must be regulated so as not to exceed a barrel in forty-eight hours. The molasses must be suffered to remain from three to eight days, or until the granulation is complete. During the process of granulation, the sugar-house should be kept at a temperature of not less than 80° nor more than 100° Fahrenheit. When the granulation is completed the sugar must be taken from the conduits with shovels and put into sacks holding from twenty-five to thirty pounds, and after being thoroughly pressed, should be spread on a platform to remain forty-eight hours, with occasional stirring. It will then be ready for market.

Having thus described my invention, what I claim, and desire to secure by Letters Patent, is—

The conduits $f$, $e$, $h$, L, K, $d$, and trough $m$, in combination with the sugar-house A, the whole constructed arranged, and operating in the manner and for the purpose herein described.

In testimony that I acknowledge the foregoing as my own, I hereby affix my signature in the presence of two witnesses.

F. MICHAEL.

Witnesses:
J. H. BOWMAN,
A. STIVER.